United States Patent
Henno et al.

(10) Patent No.: US 6,563,103 B1
(45) Date of Patent: May 13, 2003

(54) IMAGE SENSOR AND METHOD OF OPERATING AN IMAGE SENSOR

(75) Inventors: Christiane Henno, Tuebingen (DE); Roger Bauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,778

(22) PCT Filed: Feb. 8, 2000

(86) PCT No.: PCT/DE00/00379

§ 371 (c)(1),
(2), (4) Date: Jan. 5, 2001

(87) PCT Pub. No.: WO00/51339

PCT Pub. Date: Aug. 31, 2000

(30) Foreign Application Priority Data

Feb. 24, 1999 (DE) .......................................... 199 07 971

(51) Int. Cl.[7] .............................................. H01L 27/00
(52) U.S. Cl. ................................ 250/208.1; 250/214.1; 348/294
(58) Field of Search .......................... 250/208.1, 214.1, 250/214 R; 348/294, 296, 297, 308, 313; 257/291, 292, 290

(56) References Cited

U.S. PATENT DOCUMENTS

| | | | | |
|---|---|---|---|---|
| 5,408,113 A | * | 4/1995 | Kanno et al. ................ | 257/292 |
| 5,608,204 A | * | 3/1997 | Hofflinger et al. ......... | 250/208.1 |
| 6,037,979 A | * | 3/2000 | Yonemoto .................... | 348/308 |
| 6,130,423 A | * | 10/2000 | Brehmer et al. ......... | 250/208.1 |
| 6,248,991 B1 | * | 6/2001 | Chen et al. .............. | 250/208.1 |
| 6,350,981 B1 | * | 2/2002 | Uno ........................ | 250/214 R |

FOREIGN PATENT DOCUMENTS

| | | |
|---|---|---|
| DE | 196 26 427 | 1/1997 |
| WO | 98 19453 | 5/1998 |

OTHER PUBLICATIONS

Racquier, N. et al., "Random Addressable CMOS Image Sensor for Industrial Applications," Sensors and Actuators A, vol. A44, No. 1, Jul. 1, 1994, pp. 29–35.

Decker et al., S., 1998 IEEE International Solid State Circuits Conference, pp. 176–177. Feb. 1998.

* cited by examiner

Primary Examiner—Kevin Pyo
Assistant Examiner—Seung C. Sohn
(74) Attorney, Agent, or Firm—Kenyon & Kenyon

(57) ABSTRACT

To improve a decay time of an image sensor that has a plurality of light sensor elements and to permit higher image repetition rates, where a first signal level representative of a light intensity is picked up by the light sensor element, the light sensor element is reset and then a resulting second signal level is picked up, an output of the light sensor element is initialized at a signal level, which is selected as a function of the first signal level picked up, before picking up the first signal level again.

13 Claims, 2 Drawing Sheets

IMAGE SENSOR AND METHOD OF OPERATING AN IMAGE SENSOR

FIELD OF THE INVENTION

The present invention relates to a method of operating an image sensor that has a plurality of light sensor elements. The method includes the following steps for each light sensor element:

a) at an output of the light sensor element, picking up a first signal level representative of a quantity of light picked up by the light sensor element, and b) resetting the light sensor element and picking up a resulting second signal level.

The present invention also relates to an image sensor that has a plurality of light sensor elements, each having an output for outputting a signal level representative of the quantity of light picked up by the light sensor element, and a reset circuit element for resetting the light sensor elements on the basis of a reset signal that is the same for all light sensor elements.

BACKGROUND INFORMATION

An image sensor and a method of operating the image sensor are described by S. Decker, R. McGrath, K. Brehmer, and C. Sodini in the 1998, IEEE International Solid State Circuits Conference at pages 176–177.

Resetting the light sensor elements and picking up the resulting second signal level are necessary in order to compensate for irregularities that can occur between individual pixels or light sensor elements of an image sensor, e.g., in the dark current of a photosensitive semiconductor junction or an amplifier, if provided, connected to the semiconductor junction. Such irregularities are combined under the collective term fixed pattern noise (FPN). Compensation is essential for detection of the quantity of light picked up by the light sensor element with a high brightness resolution or high brightness dynamics, in particular when the light sensor elements is designed according to CMOS technology.

Resetting results in the output signal of each light sensor element oscillating between a fixed reset level and a lighting-dependent level at a frequency corresponding to the image pick-up frequency of the image sensor, in which case the difference between the two levels may be substantial. The return from the reset level to the lighting-dependent level is associated with charging or recharging of the capacitance of the light sensor element, which must be accomplished essentially by the photoelectric current of the photosensitive semiconductor. Therefore, the image sensor requires a certain recovery time after each reset before brightness signals can be picked up again by its individual light sensor elements. Although the photoelectric current of a single element can easily be increased by increasing the area of the photosensitive semiconductor junction, this does not permit a higher image pickup frequency, because its capacitance also increases with the area of the junction.

SUMMARY

As an additional step in the method according to the present invention, after resetting the light sensor element and before picking up another signal level from the output of the light sensor element, the output is initialized at a signal level that is selected as a function of the first signal level, which was picked up previously from this output and is representative of the light intensity picked up. This additional step is based on the fact that the brightness value picked up by a light sensor element during a given image cycle is usually near the level picked up during the preceding cycle. Consequently, if the output of the light sensor element is initialized at a level which is at least near the level, previously picked up this light sensor element, it shortens the amount of time the light sensor element will need to stabilize at a level representative of the amount of light instantaneously picked up. The signal level selected as a function of the first signal level for initialization is, for example, identical to the first signal level picked up previously.

The effect of this additional step is that the signal level set when the light sensor element is reset can be selected freely and may also be inside the dynamic range of the sensor element. Selecting a signal level outside the dynamic range is supported by the simple circuitry with which this embodiment can be implemented; when a signal level inside the dynamic range is used, a shorter reaction time of the sensor element can be achieved, because operation of the circuit modules in the saturation range is avoided.

This additional step is advantageous in a method where the signal level resulting from the reset is outside the dynamic range of the light sensor element, and thus the difference between the two signal levels picked up is not negligible, regardless of the light intensity picked up by the light sensor element.

In the method and the image sensor according to the present invention, however, the signal level resulting from the reset may also be inside the dynamic range of the sensor element.

This signal level is the same for all image cycles during operation of the image sensor.

An advantageous application of this method is for image sensors where the light sensor element includes a photodiode or a phototransistor operated at a weak inversion. Such image sensors have the advantage that their phototransistors generate a photoelectric current that in turn generates a voltage signal level proportional to the logarithm of the illuminance, and therefore permit a determination of brightness values over a range of up to 8 decades with a performance similar to that of the human eye. This advantage is gained at the expense of extremely low photoelectric currents, which is why the change in signal level associated with the reset is especially problematical with such image sensors.

Corresponding advantages like those achieved with the method according to the present invention are also achieved with the image sensor according to the present invention, which includes an initialization circuit element for initializing the output of a light sensor element at a level that can be preselected for each light sensor element by a control signal received by the initialization circuit element.

Such an image sensor includes, for example, a memory element for storing the signal level representative of the light intensity and for outputting the stored signal level as a control signal to the initialization circuit element. These memory elements are combined, for example, in a common memory array. Combining them in this way permits a space-saving integration of the memory elements. In addition, each memory element can be assigned to different light sensor elements in the time-division multiplex method.

The alternative of integrating a memory element into each individual light sensor element has the advantage that the signal paths are shorter and consequently the sensor element is faster and less sensitive to external interference.

A phototransistor operated at a weak inversion can only supply a signal having a relatively high impedance, so an amplifier is preferably provided for each individual light sensor element. This amplifier is capable of outputting a signal that is relatively insensitive to interference and noise onto a bus line of the image sensor. To minimize the power consumption of the amplifier, it is preferably designed as a voltage follower having unit gain.

DETAILED DESCRIPTION

Figure 1:
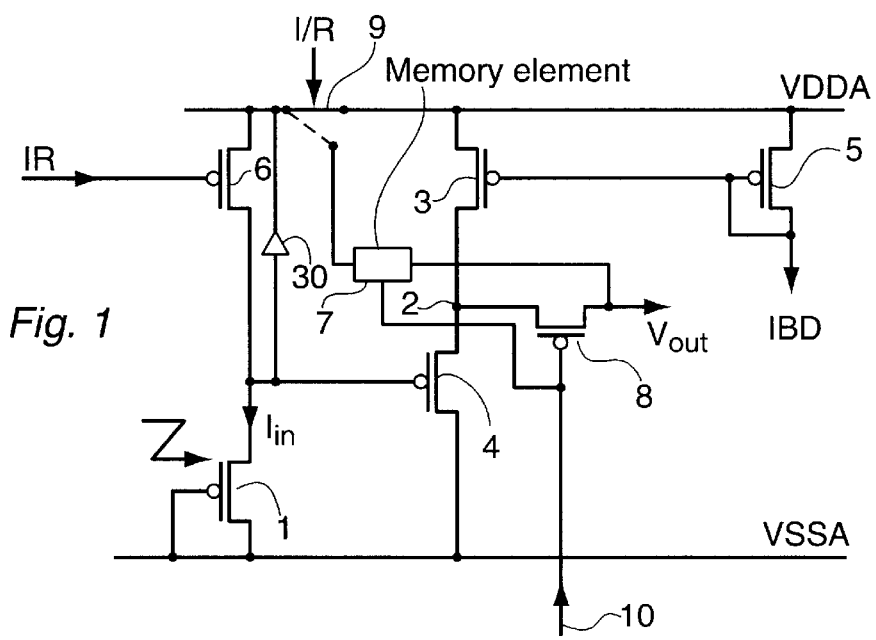
FIG. 1 shows a first embodiment of a light sensor element of an image sensor according to the present invention.

FIG. 1 shows a first embodiment of a light sensor element according to the present invention. A p channel CMOS phototransistor 1 is connected to a first main electrode and its gate to a first power supply potential VSSA; the second main electrode is connected to the gate of a first transistor 4. A bulk electrode of the phototransistor is connected to power supply potential VDDA. This connection acts like a parasitic source-bulk diode that is connected in the non-conducting direction between power supply potential VDDA and the second main electrode of the phototransistor and is therefore shown in the figure as such a diode 30. Diode 30 is the active area of the sensor and generates the photoelectric current as a function of the illuminance.

First transistor 4 is connected in series to a second transistor 3 between the two power supply potentials VSSA and VDDA. A control transistor 5 has main electrodes connected to power supply potential VDDA, i.e. an output IBD, and its gate is connected to output IBD and the gate of second transistor 3. By adjusting a current drawn from connection IBD, e.g., with the help of a potentiometer (not shown), the potential at the gate of second transistor 3 and thus the gain of the isolation amplifier can be adjusted. Transistors 3 and 5 thus form a current level.

Phototransistor 1 operates at a low inversion, which has the effect that photoelectric current $I_{in}$ following through it is proportional to the illuminance, but the voltage drop at the phototransistor is proportional to the logarithm of the illuminance. This logarithmic relationship is valid over eight decades of illuminance, which makes it possible to process images with extremely great brightness differences. This is desirable in particular in applications in automotive engineering, where it is often necessary to be able to process images with extremely great brightness differences, e.g., when driving out of a tunnel, when driving with oncoming traffic in the dark or in the case of solar reflection on an image object.

To permit low-noise processing of the photoelectric current, the second main electrode of phototransistor 1 is connected to the gate of first transistor 4, which functions as an isolation amplifier and supplies at point 2 a potential. The potential at point 2 can change exactly in accordance with the gate potential, whose internal resistance is much lower, so that it can be transmitted over greater distances within an image sensor that has a plurality of light sensor elements of the type shown in FIG. 1, without the unavoidable capacitance of the transmission lines or parasitic interference signals greatly falsifying the detection result. Point 2 thus has the function of an output of the image sensor element. A decoder transistor 8 is connected between point 2 and a coupling point $V_{out}$ and can be addressed over a decoder input 10, to switch the potential at point 2 through to coupling point $V_{out}$. Coupling points of a plurality of light sensor elements can thus be applied to a common bus line.

An image sensor includes a plurality of light sensor elements having components described above with respect to FIG. 1, as well as having known row and column decoder circuits that can be controlled over an address bus for selective activation of decoder input 10. In contrast with the popular CCD elements, for example, this embodiment makes it possible to selectively scan individual segments of a recorded image without destroying the brightness information recorded by the image sensor.

Additional important elements of the light sensor element from FIG. 1 include an initialization and reset transistor (hereinafter abbreviated as IR transistor) 6 and an initialization and reset switch 9. A similar memory element 7 may be provided as part of the light sensor element, as shown in the figure, but a memory element may also be provided outside the light sensor element and assigned to multiple light sensor elements, as explained below.

Figure 2:
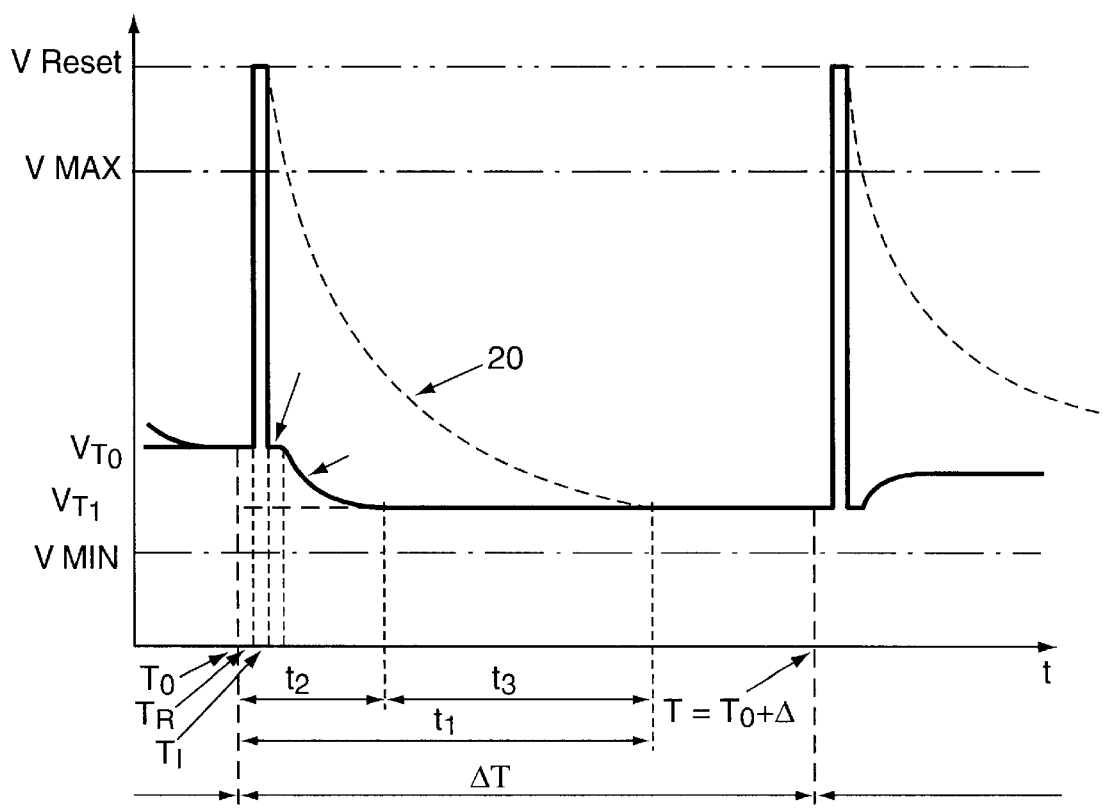
FIG. 2 shows a typical time characteristic of a signal output of a light sensor element according to the present invention.

To explain the functions of IR transistor 6, memory element 7 and I/R switch 9, FIG. 2 is described. It shows a typical time characteristic of the potential at point 2, such as that occurring in the course of a method for operating an image sensor according to the present invention. At time $T_0$ the potential at point 2 has a value $V_{T0}$ that is representative of the quantity of light picked up previously by the phototransistor. This value is between limits $V_{MIN}$ and $V_{MAX}$, the first of which corresponds to the dark current of the phototransistor and the second to the maximum recording level. At time $T_0$ decoder transistor 8 is connected over decoder input 10, and voltage value $V_{T0}$ is output to a downstream processing circuit. At the same time, memory element 7 is activated, so that voltage value $V_{T0}$ is stored in it. At time $T_R$ the light sensor element is reset by applying a connection pulse to the gate of IR transistor 6, so that it becomes conductive and potential VDDA applied to its first main electrode over I/R switch 9, which is normally in the position shown in FIG. 1, is transmitted to phototransistor 1. The potential of point 2 then assumes the value $V_{Reset}$ that is greater than $V_{MAX}$, i.e., it is outside the dynamic range of the respective light sensor element. The potential of point 2 may also be inside the dynamic range if I/R switch 9 is not at VDDA, but instead is at another potential.

$V_{Reset}$ is also detected by the downstream processing circuit, which then calculates the difference between $V_{Reset}$ and $V_{T0}$ to thereby arrive at a measured value for the illuminance of the respective light sensor element, which is essentially free of fixed pattern noise (correlated double sampling).

As a result of this reset, the lighting-dependent potential at the second main electrode of phototransistor 1 is far away from the level corresponding to the prevailing lighting conditions. A long time is necessary to achieve this latter level merely through the photoelectric current in phototransistor 1, because the phototransistor is in weak inversion, so the photoelectric current is extremely low, but at the same time the photosensitive floating source of the transistor has a large area and thus its capacitance is not negligible. This state of affairs is illustrated by dotted line curve 20 in FIG.

2. This requires a period of time $t_1$ to reach a value $T_{T1}$ corresponding to the illuminance in time interval $\Delta T$.

To shorten this period of time, I/R switch 9 is switched temporarily at time $T_I$ from the position shown in FIG. 1 into its second position where it connects IR transistor 6 to an output of memory element 7 to which previously stored value $V_{T0}$ is applied. This value is transmitted from IR transistor 6 to the second main electrode is phototransistor 1 with the help of a second switch pulse at input IR. The time required for this is negligible in comparison with the time needed to restore the corresponding value merely with the help of the photoelectric current. The difference between $V_{T0}$ and $V_{T1}$ corresponds only to the change in illuminance at the phototransistor between operating cycles of the circuit and is thus much smaller than the difference between $V_{Reset}$ and $V_{T1}$, so the time $t_2$ required for an essentially steady-state potential to be established at point 2 is much shorter than $t_1$. It is thus possible to drastically shorten the scanning cycles of the light sensor element and increase the image rate of the image sensor accordingly.

The factor by which the image repeat rate can be increased is surprisingly larger than would be expected merely by comparing the intervals $t_1$ and $t_2$ shown in FIG. 2. The reason for this is that with an increase in image repeat rate, the brightness difference between two successive scanning cycles usually decreases and for this reason the time needed to achieve a new steady-state potential at point 2 decreases.

Figure 3:
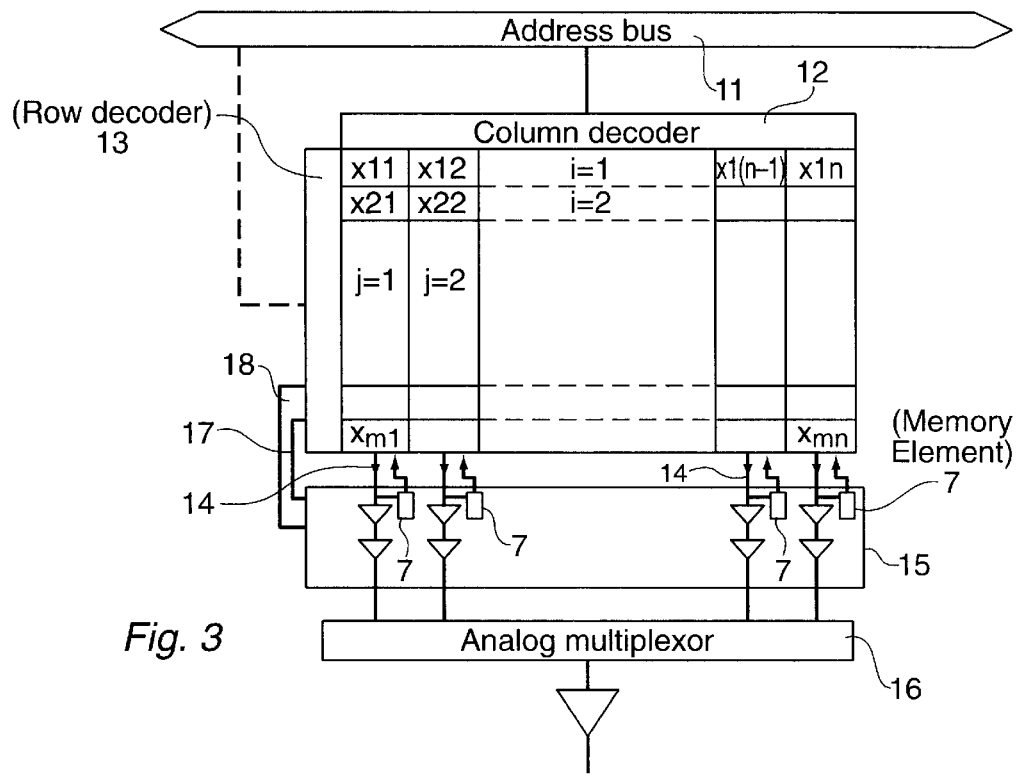
FIG. 3 shows a schematic of a circuit diagram of an image sensor according to the present invention.

FIG. 3 schematically shows an image sensor according to the present invention. It includes a matrix arrangement of m rows and n columns, with each element of the matrix representing a light sensor element as shown in FIG. 1. Column and row decoders 12, 13 are connected in a conventional manner to an address bus 11 to address the corresponding light sensor element over its decoder input 10 as a function of an address specified on the address bus and to cause it to output the voltage applied at its point 2 to a bus line 14 by means of which each is connected to the outputs of all light sensor elements of a column. The contents of the individual light sensor elements can be read out by rows in parallel. Bus lines 14 lead to a correlated triple sampling (CTS) circuit 15. The CTS circuit controls the sampling of individual cells according to the method described above by the fact that, in a first sampling step, it samples the potentials applied at points 2 of the individual light sensor elements and then stores them in a memory element 7 assigned to each individual bus line 14 or column, and sends a reset pulse over a line 17 and row decoder 13 to the cells of a row; samples the potentials subsequently output by the cells in a second sampling step; and in a third step switches I/R switch 9 of each light sensor element of the row with the help of a line 18 and overwrites the output potential with the value stored individually for each light sensor element of the row in memory element 7 of the corresponding column. Each memory element is thus assigned to all the light sensor elements of the column in succession in a time-division multiplex method as part of an image cycle.

With the help of an analog multiplexer 16, CTS circuit 15 interleaves the resulting brightness signals to form an image signal, which may be displayed on a monitor, for example, and can be processed further by a pattern recognition circuit or the like.

Figure 4:
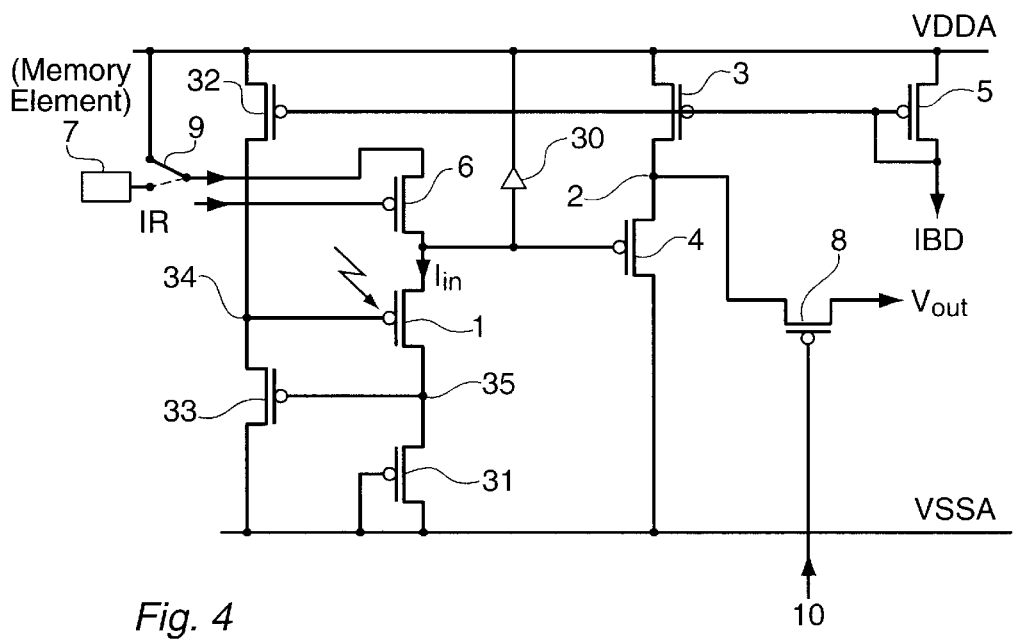
FIG. 4 shows a second embodiment of a light sensor element according to the present invention.

FIG. 4 shows a further embodiment of the light sensor element shown in FIG. 1. Elements occurring in the light sensor element of FIG. 1 with the same design and the same function are labeled with the same reference numbers and need not be explained in detail again. Memory element 7 is arranged outside the remaining light sensor element shown in FIG. 4 and can be assigned to different light sensor elements by means of switch 9, as described above with respect to FIG. 3.

A diode 30 is switched between power supply potential VDDA and a main electrode of phototransistor 1 in the non-conducting direction. The leakage current of this photodiode 30 flows through phototransistor 1 and a transistor 31 connected in series with it to second power supply potential VSSA. Two other transistors 32, 33 are connected in series between the two power supply potentials. Transistor 32 is controlled in the same manner as transistor 3 described above with respect to FIG. 1 over transistor 5 and output current IBD drawn over this transistor. Transistors 32 and 33 are dimensioned so that a potential is applied at central point 34 between them, which is connected to the gate of phototransistor 1, ensuring that phototransistor 1 is constantly operated in weak inversion.

At the same time, this also causes transistors 31 and 33 to be operated in weak inversion.

If the photoelectric current increases, there is an increase in the potential at central point 35 between phototransistor 1 and transistor 31 to which the gate of transistor 33 is connected. The potential at central point 34 increases due to the gain of transistor 33. Accordingly, the gate-source voltage of phototransistor 1 increases. Due to this feedback, the gate potential of transistor 4 increases much more rapidly and to a greater extent than is the case with the circuit according to FIG. 1. The circuit according to FIG. 4 therefore makes it possible to design faster image sensors or image sensors with smaller light sensor elements, which are therefore integrated in a more compact arrangement accordingly, depending on the needs of the user.

What is claimed is:

1. An image sensor, comprising:

a plurality of light sensor elements, each of the light sensor elements having an output for outputting a signal level representative of a light intensity picked up by the light sensor element;

a reset circuit element configured to reset the light sensor elements as a function of a reset signal, the reset signal being the same for all of the light sensor elements; and an initialization circuit element configured to initialize the output of each of the light sensor elements at a level, the level being preselected for each of the light sensor elements by a control signal received by the initialization circuit element.

2. The sensor according to claim 1, wherein:

each of the light sensor elements includes one of a phototransistor and a photodiode, the one of the phototransistor and the photodiode operating at a weak inversion.

3. The sensor according to claim 2, wherein:

the phototransistor has a floating source.

4. The sensor according to claim 1, wherein:

each of the light sensor elements includes an amplifier.

5. The sensor according to claim 4, wherein the amplifier is a voltage follower.

6. The sensor according to claim 1, further comprising:

at least one memory element configured to store the signal level representative of the light intensity and to output the stored signal level to the initialization circuit element.

7. The sensor according to claim 6, wherein:

each of the at least one memory element is configured to connect to one of the light sensor elements in multiplex.

8. The sensor according to claim 6, wherein:

the at least one memory element includes multiple memory elements, the multiple memory elements being combined to form one memory array.

9. The sensor according to claim 6, wherein:

each of the light sensor elements includes a memory element.

10. A method of operating an image sensor having a plurality of light sensor elements, the method comprising:

for each of the light sensor elements:
(a) picking up a first signal level at an output of the light sensor element, the first signal level being representative of a quantity of light picked up by the light sensor element;
(b) resetting the light sensor element and picking up a resulting second signal level;
(c) initializing the output of the light sensor element at a third signal level, the third signal level being selected as a function of the first signal level; and
(d) after the initializing step, repeating step (a).

11. The method according to claim 10, wherein:

the second signal level is one of inside a dynamic range of the light sensor element and outside the dynamic range of the light sensor element.

12. The method according to claim 10, wherein:

the light sensor element includes one of a photodiode and a phototransistor, the one of the photodiode and the phototransistor being operated at a weak inversion.

13. A method of operating an image sensor having a plurality of light sensor elements, the method comprising:

for each of the light sensor elements:
(a) picking up a first signal level at an output of the light sensor element, the first signal level being representative of a quantity of light picked up by the light sensor element;
(b) resetting the light sensor element and picking up a resulting second signal level;
(c) initializing the output of the light sensor element at a third signal level, the third signal level being selected as a function of the first signal level, wherein the third signal level is equal to the first signal level; and
(d) after the initializing step, repeating step (a).

* * * * *